United States Patent
Inomata (10) Patent No.: US 12,422,957 B2
(45) Date of Patent: Sep. 23, 2025

(54) INFORMATION PROCESSING APPARATUS, COMPUTER READABLE MEDIUM, AND INFORMATION PROCESSING METHOD FOR DETERMINING POSITION OF NON-CONTACT OPERATION ON OPERATION SURFACE

(71) Applicant: FUJIFILM Business Innovation Corp., Tokyo (JP)

(72) Inventor: Kohshiro Inomata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 486 days.

(21) Appl. No.: 17/859,006

(22) Filed: Jul. 7, 2022

(65) Prior Publication Data

US 2023/0305662 A1    Sep. 28, 2023

(30) Foreign Application Priority Data

Mar. 25, 2022  (JP) .................. 2022-050407

(51) Int. Cl.
  G06F 3/044  (2006.01)
  G06F 3/01   (2006.01)
  G06F 3/042  (2006.01)

(52) U.S. Cl.
  CPC .......... G06F 3/044 (2013.01); G06F 3/017 (2013.01); G06F 3/042 (2013.01); G06F 2203/04108 (2013.01)

(58) Field of Classification Search
  CPC .......... G06F 3/044; G06F 3/017; G06F 3/042; G06F 2203/04108; G06F 3/04186; G06F 2203/04101
  See application file for complete search history.

(56) References Cited

U.S. PATENT DOCUMENTS 10,126,856 B2 * 11/2018 Miyakawa .......... G06F 3/04186
2011/0248918 A1  10/2011 Yoo et al.
(Continued)

FOREIGN PATENT DOCUMENTS

JP  2002055781   2/2002
JP  2012234317   11/2012

OTHER PUBLICATIONS

"Search Report of Europe Counterpart Application", issued on Jul. 26, 2023, p. 1-p. 6.

*Primary Examiner* — David D Davis
(74) *Attorney, Agent, or Firm* — JCIPRNET (57) ABSTRACT

An information processing apparatus includes a processor configured to: detect a closest portion being a portion having a shortest distance from an operation surface in a perpendicular direction of the operation surface among portions of an object in a spatial region facing the operation surface; determine a position on the operation surface corresponding to a position of the closest portion as an instruction input position by a non-contact operation of a user; and, in a case where a distance between a first position of the closest portion detected at a first time point and a second position of the closest portion detected at a second time point after the first time point, in a plane direction parallel to the operation surface is equal to or longer than a threshold distance, invalidate an instruction input on a position on the operation surface corresponding to the second position.

10 Claims, 6 Drawing Sheets

(56) References Cited

U.S. PATENT DOCUMENTS

| | | | |
|---|---|---|---|
| 2015/0062033 A1* | 3/2015 | Ishihara | G06F 3/017 |
| | | | 345/173 |
| 2016/0202768 A1* | 7/2016 | Yoshida | G06F 3/041 |
| | | | 345/156 |
| 2019/0179528 A1* | 6/2019 | Saito | G06F 3/04186 |

* cited by examiner

INFORMATION PROCESSING APPARATUS, COMPUTER READABLE MEDIUM, AND INFORMATION PROCESSING METHOD FOR DETERMINING POSITION OF NON-CONTACT OPERATION ON OPERATION SURFACE

CROSS-REFERENCE TO RELATED APPLICATIONS

This application is based on and claims priority under 35 USC 119 from Japanese Patent Application No. 2022-050407 filed Mar. 25, 2022.

BACKGROUND

(i) Technical Field

The present invention relates to an information processing apparatus, a non-transitory computer readable medium storing an information processing program, and an information processing method.

(ii) Related Art

In the related art, there has been proposed an information processing apparatus capable of a non-contact operation in which an operation on an operation surface is performed by an operation object such as a finger or a stylus without directly touching the operation surface.

For example, JP2012-234317A discloses an information processing apparatus that changes the display content of a screen by moving a hand brought close to the screen without touching the screen as an operation surface along the screen. The information processing apparatus determines whether or not to execute a process of changing the display content in response to the movement of the hand along the screen, based on the tilt of the hand brought close to the screen. JP2002-055781A discloses an information processing apparatus that outputs a warning in a case where a user simultaneously touches two places on an operation surface on a touch panel although not by a non-contact operation, and suspends a process until the user releases the touches at the two places.

SUMMARY

The followings are considered in an information processing apparatus having an operation surface. The information processing apparatus detects the closest portion being a portion having the shortest distance from the operation surface in a perpendicular direction of the operation surface among portions of an object in a spatial region facing the operation surface, and determines the position on the operation surface corresponding to the position of the closest portion as an instruction input position by a non-contact operation of a user. In this manner, it is possible to make a non-contact operation on the operation surface. The spatial region facing the operation surface means a region that faces the operation surface in a space close to the operation surface, and in which a distance from the operation surface in the perpendicular direction of the operation surface is within a predetermined distance.

In such an information processing apparatus capable of a non-contact operation, a case where a user performs a non-contact operation on an operation surface by using an operation object such as a finger or a stylus is considered.

Here, in a case where the tip of the operation object is the closest portion, it is considered that the user is capable of inputting input an instruction to the intended position on the operation surface. However, in a case where a portion other than the tip of the operation object unintentionally becomes the closest portion during a non-contact operation, the instruction is input to a position different from the position on the operation surface intended by the user. The portion other than the tip of the operation object is not limited to examples as follows, but, for example, a portion of the wrist of the user holding the operation object, the abdomen of the user, the chest of the user, and the like.

Aspects of non-limiting embodiments of the present disclosure relate to an information processing apparatus, a non-transitory computer readable medium storing an information processing program, and an information processing method that are to suppress an occurrence of a situation in which an instruction is input to a position different from a position on an operation surface intended by a user in a case where the user performs a non-contact operation on the operation surface by using an operation object. In the information processing apparatus, a position on the operation surface corresponding to a position of the closest portion is set as an instruction input position by the non-contact operation of the user.

According to an aspect of the present disclosure, there is provided an information processing apparatus including a processor. The processor is configured to: detect a closest portion being a portion having a shortest distance from an operation surface in a perpendicular direction of the operation surface among portions of an object in a spatial region facing the operation surface; determine a position on the operation surface corresponding to a position of the closest portion as an instruction input position by a non-contact operation of a user; and, in a case where a distance between a first position of the closest portion, which is detected at a first time point, and a second position of the closest portion, which is detected at a second time point after a minute time has elapsed from the first time point, in a plane direction parallel to the operation surface is equal to or longer than a threshold distance, invalidate an instruction input on a position on the operation surface corresponding to the second position or output a warning to the user.

BRIEF DESCRIPTION OF THE DRAWINGS

Exemplary embodiment(s) of the present invention will be described in detail based on the following figures, wherein.

DETAILED DESCRIPTION

Figure 1:
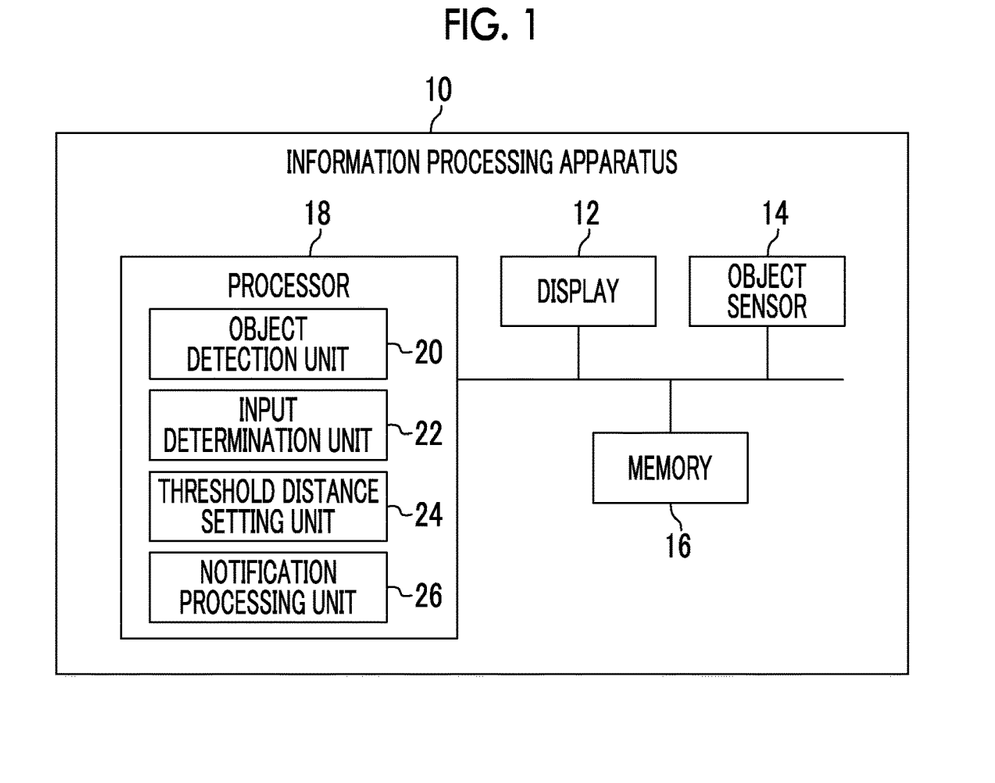
FIG. 1 is a schematic configuration diagram illustrating an information processing apparatus according to a present exemplary embodiment.

FIG. 1 is a schematic configuration diagram illustrating an information processing apparatus 10 according to the present exemplary embodiment. As will be described in detail later, the information processing apparatus 10 is an apparatus capable of a non-contact operation. The non-contact operation is to perform an operation on an operation surface by an operation object without directly touching the operation object on the operation surface (display 12 in the present exemplary embodiment). The operation object is provided for performing a non-contact operation, for example, a finger of a user or a stylus. The non-contact operation is also called a hover operation.

In the present exemplary embodiment, the information processing apparatus 10 has a print function, a copy function, a scan function, and the like. The information processing apparatus is a multifunction device that executes a printing process, a copy process, a scanning process, or the like in response to a processing command (job) from the user, but the information processing apparatus 10 is not limited to this. Any apparatus may be used as long as the non-contact operation is possible.

As illustrated in FIG. 1, the information processing apparatus 10 includes a display 12, an object sensor 14, a memory 16, and a processor 18. In addition, although not illustrated in FIG. 1, the information processing apparatus 10 may include a communication interface (for example, network interface card (NIC)) that communicates with other devices via a communication line such as a local area network (LAN) and a wide area network (WAN), a contact operation interface (for example, button and touch panel) that receives an instruction from a user by a contact operation, and a processing device (for example, printer and scanner) that executes a printing process and a scanning process.

The display 12 includes, for example, a liquid crystal panel and an organic electro luminescence (EL) panel. Various screens are displayed on the display 12 by the processor 18. For example, the display 12 displays a non-contact operation screen including an operation icon that is a target of the non-contact operation. In the present exemplary embodiment, the display surface of the display 12 corresponds to the operation surface of the target of the non-contact operation.

The object sensor 14 is a sensor that detects an object that is not in contact with the display surface of the display 12 (that is, the operation surface, simply referred to as the display 12 below), but approaches the display 12. Specifically, the object sensor 14 detects the presence or absence of an object approaching the display 12 and the position of the object approaching the display 12. The position of the object includes a position in a plane direction parallel to the display 12 and a position in the perpendicular direction of the display 12. The object sensor 14 detects not only an operation object for performing a non-contact operation on the display 12, but also any object approaching the display 12.

As a method for detecting an object, various known methods may be adopted. For example, the object sensor 14 may be an electrostatic capacitance sensor that detects a change in electrostatic capacitance between the display 12 and an object. In this case, the processor 18 is capable of detecting the presence or absence and the position of the object in accordance with the change in electrostatic capacitance between the display 12 and the object detected by the object sensor 14. Alternatively, the object sensor 14 may be an optical sensor that detects light. In this case, infrared rays or laser light are emitted from a light source (not illustrated) in a display surface direction of the display 12, and the object sensor 14 detects the reflected light, particularly, the reflected light from the object. The processor 18 is capable of detecting the presence or absence and the position of the object based on the reflected light detected by the object sensor 14.

A detection signal indicating that the object has been detected and the position of the detected object is transmitted from the object sensor 14 to the processor 18.

The memory 16 is configured to include a hard disk drive (HDD), a solid state drive (SSD), an embedded multimedia card (eMMC), a read only memory (ROM), a random access memory (RAM), and the like. The memory 16 stores an information processing program for operating each unit of the information processing apparatus 10. The information processing program may also be stored in a non-transitory computer readable storage medium such as a universal serial bus (USB) memory or a CD-ROM. The information processing apparatus 10 is capable of reading and executing the information processing program from such a storage medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

As illustrated in FIG. 1, the processor 18 exhibits functions as an object detection unit 20, an input determination unit 22, a threshold distance setting unit 24, and a notification processing unit 26, in accordance with the information processing program stored in the memory 16.

The object detection unit 20 detects the closest portion being a portion having the shortest distance from the display 12 in the perpendicular direction of the display 12 among portions of an object in a spatial region facing the display 12, based on the detection signal from the object sensor 14.

Figure 2:
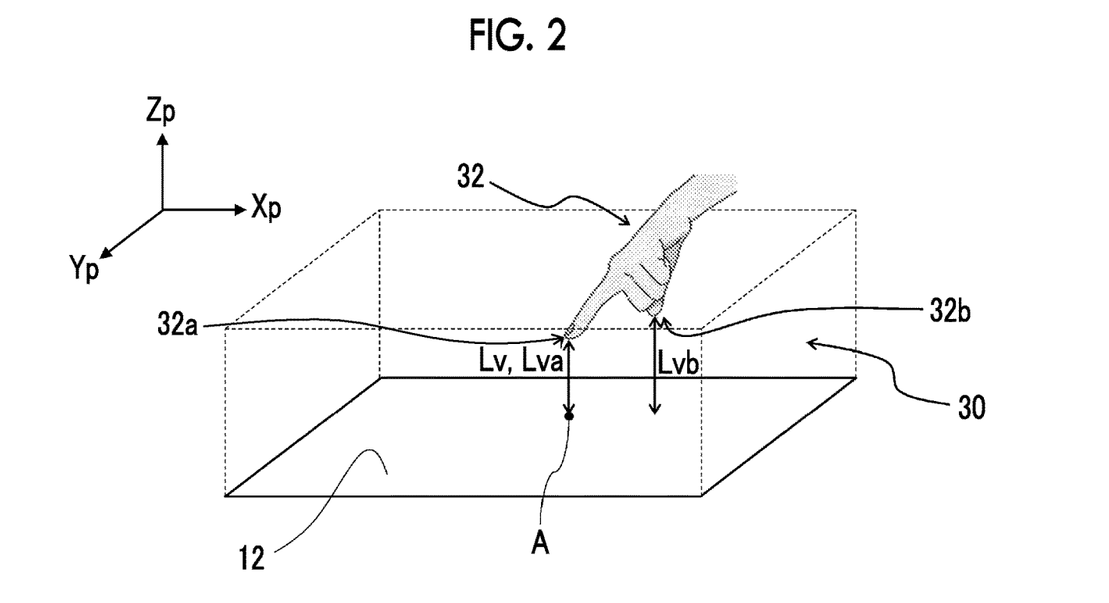
FIG. 2 is a diagram illustrating a spatial region facing a display.

The process of the object detection unit 20 will be specifically described with reference to FIG. 2. FIG. 2 is a diagram illustrating a spatial region 30 facing the display 12 and an operation object 32 having at least a portion that is located in the spatial region 30. In FIG. 2 (the same applies to FIGS. 3 to 10), a direction parallel to the display 12 (transverse direction of the display 12) is set as an Xp axis, a direction that is parallel to the display 12 and is perpendicular to the Xp axis (longitudinal direction of the display 12) is set as a Yp axis, and the perpendicular direction of the display 12 is set as a Zp axis.

The spatial region 30 facing the display 12 is a region through which the display 12 passes in a case where the display 12 is moved in parallel in the positive direction of the Zp axis, and is a region in which the distance from the display 12 in a Zp axis direction is within a predetermined distance. The predetermined distance, that is, the length of the spatial region 30 in the Zp axis direction may be determined in accordance with the detectable range of the object sensor 14. That is, the predetermined distance may be a detectable distance of an object by the object sensor 14.

As illustrated in FIG. 2, in a case where an object (operation object 32 in the example of FIG. 2) approaches the display 12, the object sensor 14 detects the object. Specifically, the object sensor 14 detects each portion of the object (for example, the tip of the index finger of the operation object 32, and the tip of the thumb), and transmits a detection signal indicating the position of each portion of the object, to the processor 18. The object detection unit 20 compares a distance Lv of each portion from the display 12 in the Zp axis direction in the spatial region 30 based on the detection signal from the object sensor 14. The object detection unit 20 detects a portion having the shortest distance Lv among the portions in the spatial region 30, as the closest portion.

In the example of FIG. 2, a portion 32a being the tip of the index finger of the operation object 32 and a portion 32b being the tip of the thumb are representatively illustrated as the portion of the object in the spatial region 30, which has been detected by the object sensor 14. The object detection unit 20 compares a distance Lva between the portion 32a and the display 12 in the Zp axis direction, a distance Lvb between the portion 32b and the display 12 in the Zp axis direction, and a distance Lv between the other portions of the object in the spatial region 30 and the display 12 in the Zp axis direction, with each other. Because the distance Lva is the shortest, the object detection unit 20 detects the portion 32a corresponding to the distance Lva, as the closest portion.

Since the object in the spatial region 30 may move, the object detection unit 20 detects the closest portion based on the detection signal from the object sensor 14 at unit time intervals. Here, the unit time interval is, for example, a time interval of several milliseconds or shorter.

The input determination unit 22 determines the position A on the display 12 corresponding to the position of the closest portion (portion 32a in the example of FIG. 2) detected by the object detection unit 20, as an instruction input position by a non-contact operation of the user. The position A on the display 12 corresponding to the position of the closest portion is a point on the display 12, which has the identical Xp coordinate and Yp coordinate to the closest portion. That is, in a case where the position of the closest portion is represented by the coordinates (Xp, Yp, Zp)=(x, y, z) in an XpYpZp space, the instruction input position has the coordinates (Xp, Yp) on the display 12, which is (x, y).

For example, in a case where an operation icon associated with a certain process is displayed at the instruction input position, the input determination unit 22 may determine that a non-contact operation is performed on the operation icon, by determining the instruction input position. In this case, from the viewpoint of, for example, suppressing an erroneous operation on the operation icon, the input determination unit 22 may determine that the non-contact operation has been performed on the operation icon, in a case where the input determination unit 22 determines that the instruction input position is continuously within a display region of the operation icon for a predetermined operation confirmation time. The processor 18 executes the process associated with the operation icon on which the non-contact operation has been performed.

Alternatively, the input determination unit 22 may be able to determine the operation by gesture. In other words, the user may be able to input an instruction by the gesture to the display 12. The gesture means the movement of the operation object 32, that is, the movement (operation pattern) of the instruction input position. In the present exemplary embodiment, the user inputs an instruction by gesture in a manner that the instruction input position is moved by moving the operation object 32 in the spatial region 30 without bringing the operation object 32 into contact with the display 12. The operation pattern of the instruction input position and the processing content are associated in advance. The input determination unit 22 is capable of detecting the operation pattern of the instruction input position (in other words, the operation pattern of the closest portion detected by the object detection unit 20), and determining the instruction content in accordance with the detected operation pattern. The processor 18 executes a process associated with the specified gesture.

In addition, the processor 18 may execute various processes based on the instruction input position determined by the input determination unit 22.

Figure 3:
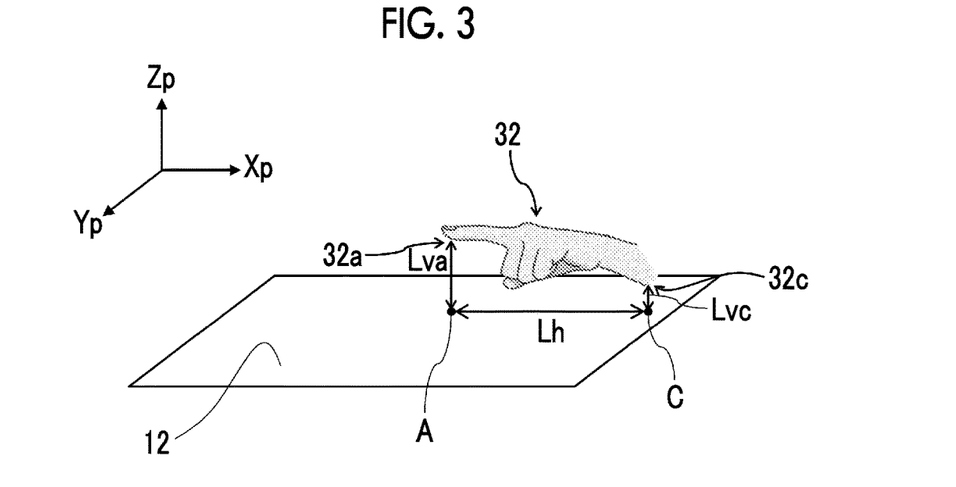
FIG. 3 is a diagram illustrating a distance between a first position and a second position in an XpYp plane.

There is considered a case where the object detection unit 20 may detect the portion other than the tip of the operation object 32 as the closest portion while the user performs a non-contact operation on the display 12 by using the operation object 32, contrary to the intention of the user. For example, as illustrated in FIG. 2, in a case where the user performs a non-contact operation by using a finger being the operation object 32, at the start of the non-contact operation, the object detection unit 20 detects the portion 32a being the tip of the index finger as intended by the user, as the closest portion. In a case where the user changes an angle of the arm, the posture of the operation object 32 becomes a posture as illustrated in FIG. 3, a distance Lvc between a portion 32c being the wrist and the display 12 in the Zp axis direction may become shorter than the distance Lva between the portion 32a and the display 12 in the Zp axis direction, and thus, the portion 32c may be detected as the closest portion. In this case, a position C corresponding to the portion 32c being the closest portion is the instruction input position instead of the position A intended by the user.

As described above, in a case where the portion other than the tip of the operation object 32 may be detected as the closest portion while the user performs a non-contact operation on the display 12 by using the operation object 32, contrary to the intention of the user, the position of the closest portion changes largely during a minute time. Here, the minute time means a considerably short time, for example, a time of several tens of millimeters or shorter. For example, in the example of FIG. 3, in a case where the user performs a non-contact operation with the index finger as the operation object 32, it is considered that the portion 32a being the tip of the index finger is slightly moved by the operation of the user, but it is unlikely that the position of the portion 32a moves to the position of the portion 32c being the wrist during a minute time.

Thus, in a case where a distance between a first position of the closest portion detected at a first time point and a second position of the closest portion detected by a second time point after a minute time has elapsed from the first time point in the plane direction parallel to the display 12 is equal to or longer than a threshold distance, the input determination unit 22 sets a determination that the position in the display 12 corresponding to the second position is set as the instruction input position, to be an erroneous determination. That is, the input determination unit 22 does not consider the position in the display 12 corresponding to the second position as the instruction input position.

A specific description will be made with reference to FIG. 3. As a premise, the input determination unit 22 detects the closest portion based on the detection signal from the object sensor 14 at a predetermined movement determination time interval. As described above, in a case where the object detection unit 20 detects the closest portion at unit time intervals, the movement determination time may be unit time, but is not necessarily required to be unit time. For example, the movement determination time may be a time for a plurality of unit hours. The movement determination time is a minute time (for example, several tens of milliseconds or shorter is intended).

At the first time point, it is assumed that the object detection unit 20 determines that the portion 32a being the tip of the index finger is the closest portion. At this time, the input determination unit 22 saves information indicating the position of the portion 32a, particularly, the Xp coordinate and the Yp coordinate of the portion 32a. Then, it is assumed that the user changes the posture of the operation object 32 as illustrated in FIG. 3, at the second time point after the movement determination time has elapsed from the first time point, the object detection unit 20 determines that the portion 32c being the wrist is the closest portion. At this time, the input determination unit 22 acquires the Xp coordinate and the Yp coordinate of the portion 32c, and then calculates the distance between the position of the portion 32a being the closest portion at the first time point and the portion 32c being the closest portion at the second time point in the plane direction parallel to the display 12 (that is, the XpYp plane direction).

In the present exemplary embodiment, the input determination unit 22 calculates a distance Lh between a position A on the display 12 corresponding to the position of the portion 32a being the closest portion at the first time point and a position C on the display 12 corresponding to the position of the portion 32c being the closest portion at the second time point. That is, the input determination unit 22 calculates the distance between the instruction input position at the first time point and the instruction input position at the second time point. The distance between the portion 32a and the portion 32c in the plane direction parallel to the display 12 does not necessarily have to be calculated by the distance between the position A and the position C on the display 12. The distance between the portion 32a and the portion 32c in the spatial region 30 in the XpYp plane direction may be calculated directly.

The input determination unit 22 compares the calculated distance Lh with a threshold distance defined in advance. In a case where the distance Lh is equal to or longer than the threshold distance, the determination that the position C is set as the instruction input position is set to be an erroneous determination. In a case where the distance Lh is shorter than the threshold distance, the input determination unit 22 sets the position C as the instruction input position. Here, the threshold distance may be set in advance by an administrator of the information processing apparatus 10 or the like, but may be set by the threshold distance setting unit 24 (details will be described later).

In a case where the determination that the position in the display 12 corresponding to the second position is set as the instruction input position is regarded as an erroneous determination, the input determination unit 22 is capable of invalidating the instruction input for the instruction input position. Alternatively, in a case where the input determination unit 22 regards the determination that the position in the display 12 corresponding to the second position is set as the instruction input position, as an erroneous determination, the notification processing unit 26 (details will be described later) outputs a warning to the user.

In a case where the portion other than the tip of the operation object 32 is detected as the closest portion, contrary to the intention of the user, while the user performs a non-contact operation on the display 12 by using the operation object 32, the second portion (portion 32c in the example of FIG. 3) is in the direction in which the user exist, rather than the first position (portion 32a in the example of FIG. 3), in many cases.

Therefore, the input determination unit 22 may set the region on an opposite side of the direction in which the user is estimated to exist with respect to the first position, in the spatial region 30 facing the display 12, as the non-detection region. In a case where the second position is located in the non-detection region, the input determination unit 22 may not regard, for example, a determination that the position on the display 12 corresponding to the second position is set as the instruction input position, as an erroneous determination. In other words, only in a case where the second position is located in the direction in which the user is estimated to exist (the region other than the non-detection region in the spatial region 30) with respect to the first position, for example, the determination that the position on the display 12 corresponding to the second position is set as the instruction input position may be regarded as an erroneous determination.

The input determination unit 22 may determine the relationship between the first position and the second position based on the positions on the display 12 corresponding to the first position and the second position. That is, the input determination unit 22 may set a region on the display 12 on an opposite side of the direction in which the user is estimated to exist, with respect to the position on the display 12 corresponding to the first position, as a non-detection region. In a case where the position on the display 12 corresponding to the second position is in the non-detection region, the input determination unit 22 may not regard the determination that the position on the operation surface corresponding to the second position is set as the instruction input position, as an erroneous determination.

The non-detection region may be, for example, a region on which an operator such as an operation icon is displayed. That is, the non-detection region may be, for example, a region in a space facing a region in which the operator such as the operation icon is displayed.

The direction in which the user is estimated to exist is, for example, the direction in which the torso of the user is estimated to exist. Alternatively, the direction in which the user is estimated to exist refers to a direction estimated to be the extension direction of the arm of the user from the tip of the operation object 32 toward the torso side of the user. The direction in which the user is estimated to exist may be set in advance.

Figure 4:
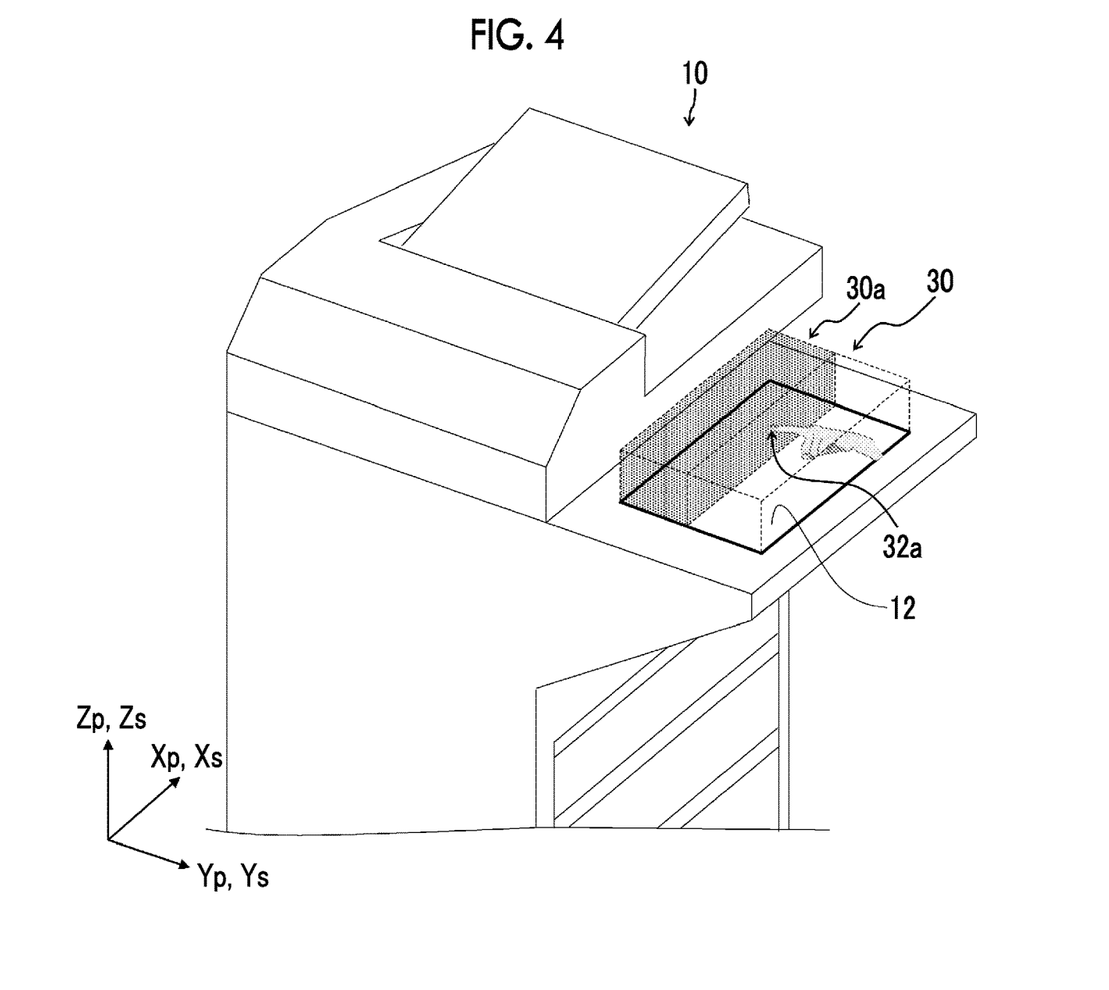
FIG. 4 is a first diagram illustrating a non-detection region.

For example, a case where the display 12 is attached to the front side of the information processing apparatus 10 as illustrated in FIG. 4 is considered. In FIG. 4 (the same applies to FIGS. 5, 7, and 8), the horizontal direction of the real space is set as an Xs axis, the direction that is the horizontal direction and is perpendicular to the Xs axis is a Ys axis, and the vertical direction is a Zs axis. In FIG. 4, the Xs axis is the transverse direction of the information processing apparatus 10, and the Ys axis is the front-back direction of the information processing apparatus 10. Further, in FIG. 4, the display 12 is installed on the horizontal plane, and the Xp axis and the Xs axis, the Yp axis and the Ys axis, and the Zp axis and the Zs axis coincide with each other.

In a case where the display 12 is attached to the front side of the information processing apparatus 10, the user normally operates the information processing apparatus 10 from the front of the information processing apparatus 10. Thus, the user is in front of the information processing apparatus 10 in many cases. Therefore, in this case, the front of the display 12 (the front of the information processing apparatus 10) may be set in advance as the direction in which the user is estimated to exist. Therefore, in a case where the position of the portion 32*a* illustrated in FIG. 4 is detected as the first position, the region behind the position of the portion 32*a* in the spatial region 30 becomes the non-detection region 30*a* (shaded portion).

Figure 5:
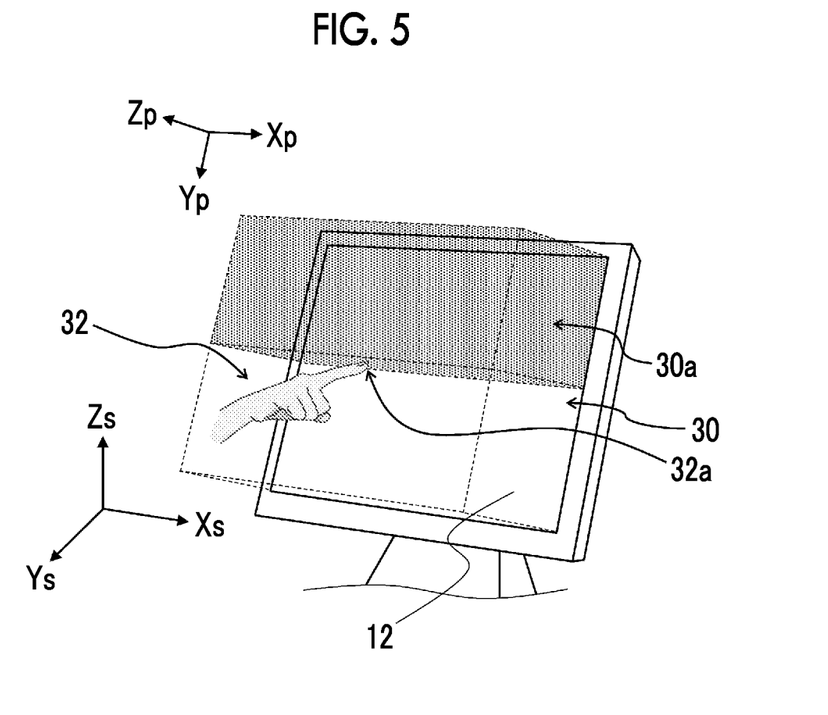
FIG. 5 is a second diagram illustrating the non-detection region.

FIG. 5 is a perspective view of the display 12. As illustrated in FIG. 5, there is considered a case where the display 12 is erected, or the display 12 is tilted so as to face the upper side in the vertical direction (positive direction side of the Zs axis) and the horizontal direction (Ys axis positive direction side in FIG. 5). In this case, there are many cases where the extension direction of the arm of the user from the tip of the operation object 32 (the tip of the finger of the user or the tip of the stylus held by the user) toward the torso side of the user is a downward direction (positive direction side of the Yp axis) along the plane direction (the direction of the XpYp plane) parallel to the display 12. Therefore, in this case, the downward direction (the positive direction side of the Yp axis) along the plane direction parallel to the display 12 may be set in advance as the direction in which the user is estimated to exist. Thus, in a case where the position of the portion 32*a* illustrated in FIG. 5 is detected as the first position, the region of the spatial region 30 on the negative direction side of the Yp axis (upper side along the Yp axis) with respect to the position of the portion 32*a* is set as the non-detection region 30*a*.

Figure 6:
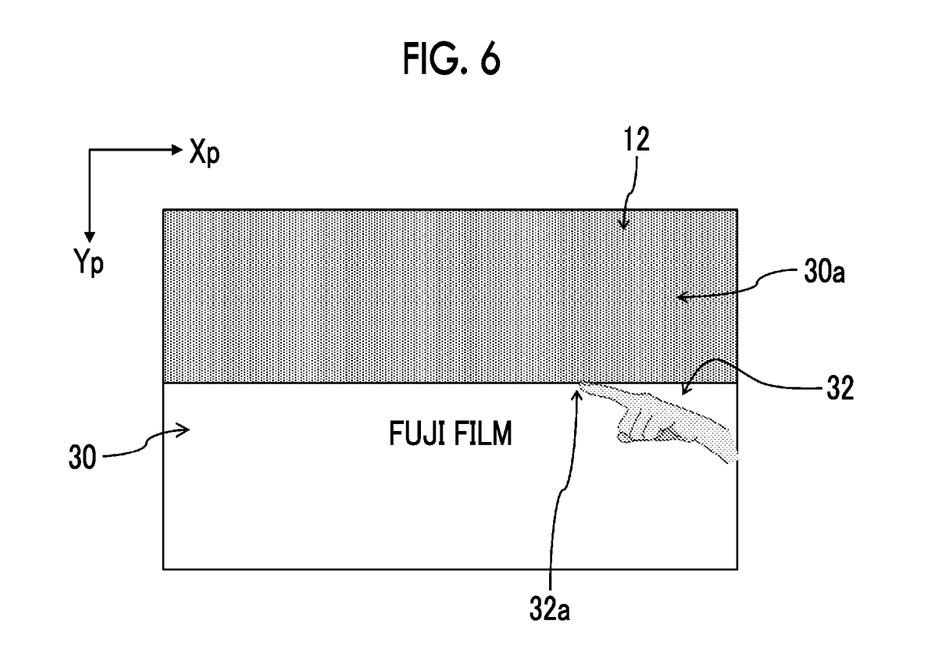
FIG. 6 is a third diagram illustrating the non-detection region.

FIG. 6 is a plan view of the display 12. As illustrated in FIG. 6, consider the case where characters are displayed on the display 12. In this case, the extension direction of the arm of the user from the tip of the operation object 32 toward the torso side of the user is opposite to an upright direction of the character (here, set to be a direction from the lower side of the upright character to the upper side) in many cases. Therefore, in this case, the opposite direction of the upright direction of the character may be set in advance as the direction in which the user is estimated to exist. Therefore, in a case where the position of the portion 32*a* illustrated in FIG. 6 is detected as the first position, a region on the upright direction side of the character closer than the position of the portion 32*a* in the spatial region 30 becomes the non-detection region 30*a*.

Figure 7:
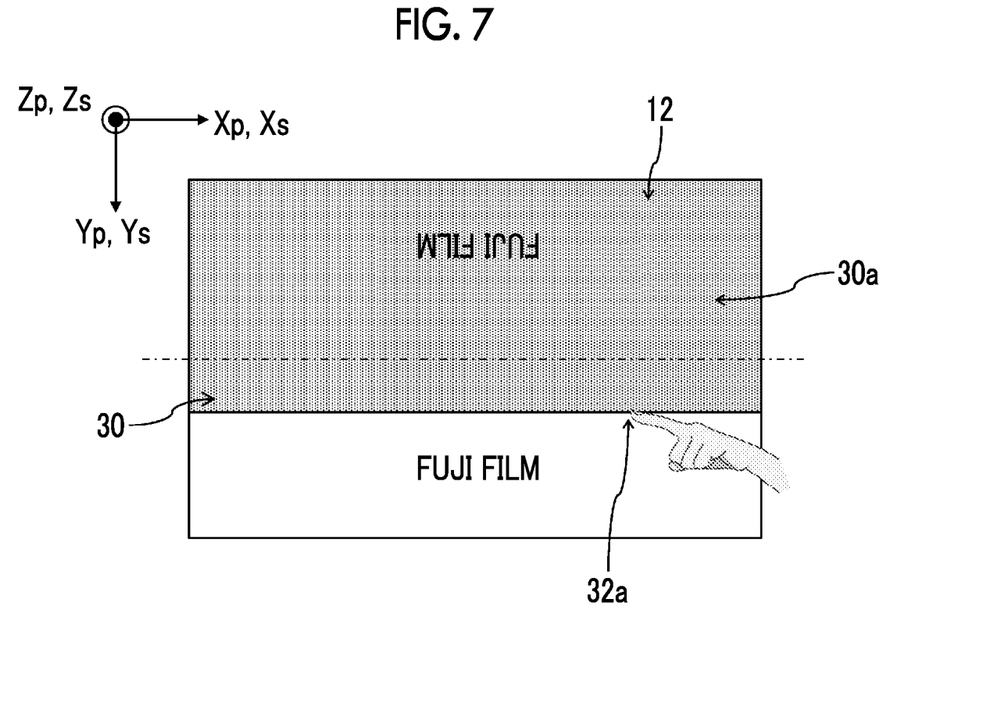
FIG. 7 is a fourth diagram illustrating the non-detection region.
Figure 8:
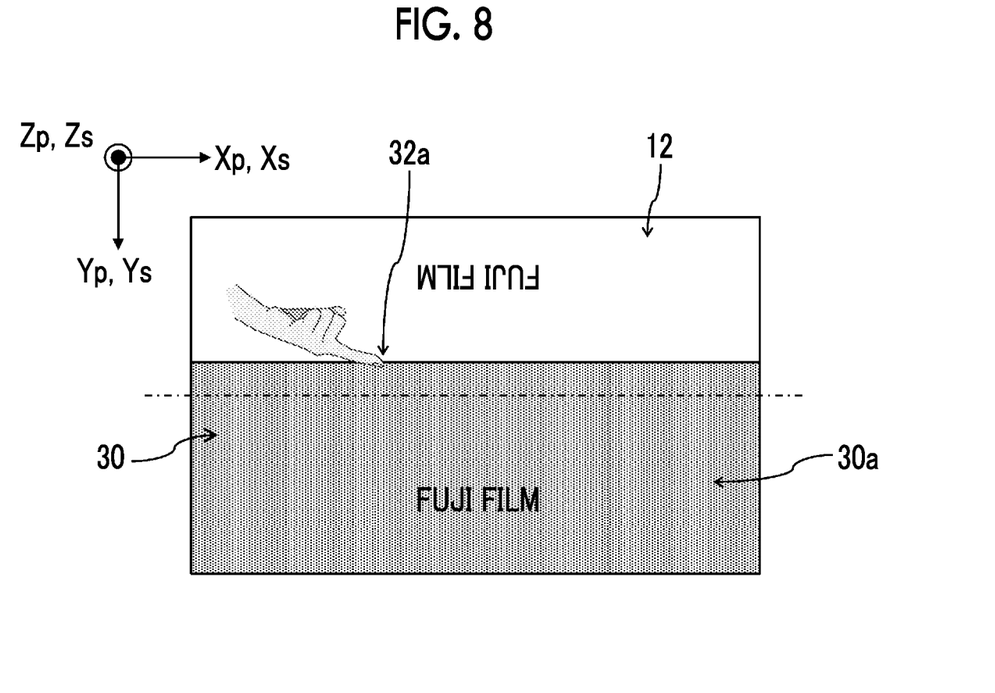
FIG. 8 is a fifth diagram illustrating the non-detection region.

The information processing apparatus 10 may be an apparatus having a table shape, or may be an apparatus in which the display 12 is provided on a table surface and a non-contact operation on the display 12 is able to be performed from a plurality of directions. FIGS. 7 and 8 are plan views of the display 12 of such an information processing apparatus 10. In such a display 12, the input determination unit 22 may determine the direction in which the user is estimated to exist, based on the detection position of the first position. In a case where the direction in which the user is estimated to exist changes, the non-detection region may be dynamically changed.

For example, it is assumed that the display 12 is viewed from two directions being the positive direction side of the Yp axis (lower side of FIG. 7) and the negative direction side of the Yp axis (upper side of FIG. 7), as illustrated in FIG. 7. In this case, for example, in a case where the input determination unit 22 detects the first position on the positive direction side of the Yp axis with respect to the center of the spatial region 30 in the Yp axis direction, which is indicated by the one-dot chain line in FIG. 7, the input determination unit 22 determines that the user is estimated to exist in the positive direction of the Yp axis. Thus, in a case where the position of the portion 32*a* illustrated in FIG. 7 is detected as the first position, the region of the spatial region 30 on the negative direction side of the Yp axis with respect to the position of the portion 32*a* becomes the non-detection region 30*a*. On the other hand, in a case where the position of the portion 32*a* illustrated in FIG. 8 is detected as the first position, the direction in which the user is estimated to exist is the negative direction of the Yp axis (upper side of FIG. 8). Thus, the region of the spatial region 30 on the positive direction side of the Yp axis closer than the position of the portion 32*a* becomes the non-detection region 30*a*.

As described above, in a case where the spatial region 30 is divided into a plurality of sub-spatial regions, and the direction in which the user is estimated to exist in a case where the first position is detected within the sub-spatial region is associated in advance, even though it is assumed that the display 12 having a table shape in the information processing apparatus 10 is viewed from three directions or more, the input determination unit 22 is capable of determining the direction in which the user is estimated to exist, based on the first position.

Further, in a case where the information processing apparatus 10 includes a sensor that detects a user around the information processing apparatus 10 (for example, a camera that captures an image of the surroundings of the information processing apparatus 10), the input determination unit 22 may acquire the direction in which the user exists, based on a detection signal of this sensor.

As described above, in a case where the input determination unit 22 is capable of determining the operation by the gesture, a case where the user is to perform the gesture operation, and thus moves the operation object 32 at a high speed in the spatial region 30 is considered. In this case, even though the portion other than the tip of the operation object 32 is not detected as the closest portion, the distance between the first position of the closest portion detected at the first time point and the second position of the closest portion detected at the second time point in the plane direction parallel to the display 12 may be equal to or more than the threshold distance. In a case where such a distance is equal to or more than the threshold distance, a problem as follows may occur: a problem that the determination that the position corresponding to the second position on the display 12 is set as the instruction input position is regarded as an erroneous determination; a problem that the gesture operation is not appropriately recognized; or a problem that a warning is erroneously output.

Thus, in a case where the second position is located in the direction defined by the gesture with respect to the first position, for example, the input determination unit 22 may not regard the determination that the position on the display 12 corresponding to the second position is set as the instruction input position, an erroneous determination. For example, it is assumed that a gesture for quickly moving the operation object 32 in the Xp direction in the spatial region 30 is defined. In this case, in a case where the second position is in the Xp axis direction of the first position, even though the distance between the first position and the second position in the plane direction parallel to the display 12 is equal to or more than the threshold distance, the input determination unit 22 does not regard a determination that the position on the display 12 corresponding to the second position is set as the instruction input position, as an erroneous determination. It is assumed that the case where the second position is in the Xp axis direction of the first position includes a case where the Yp coordinate of the first position and the Yp coordinate of the second position are identical to each other, and a case where the difference between the Yp coordinate of the first position and the Yp coordinate of the second position is within a predetermined range. Further, the direction defined by the gesture may be set separately for each screen displayed on the display 12.

Figure 9:
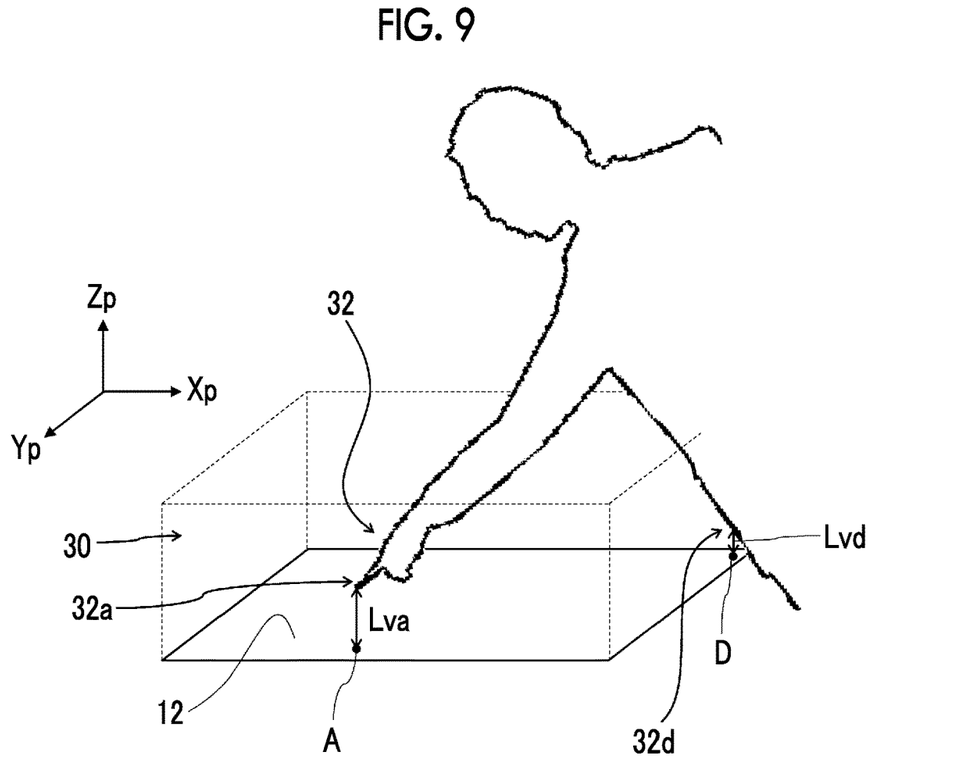
FIG. 9 is a diagram illustrating an example of a state in which an object other than an operation object is a closest portion.

Before the user performs a non-contact operation by using the operation object 32, contrary to the intention of the user, the portion (belly, chest, clothes, and the like) of the user or the portion of another object may enter into the spatial region 30 and stay in the spatial region 30. For example, as illustrated in FIG. 9, in a case where the user attempts to perform a non-contact operation on the display 12 with a finger as the operation object 32, the portion 32d being the belly of the user may enter into the spatial region 30 and then stay. In this case, the portion 32d may be detected as the closest portion, and thus the position D on the display 12 corresponding to the position of the portion 32d, which is not intended by the user, becomes the instruction input position. Further, in a case where the distance Lvd of the portion 32d in the Zp axis direction from the display 12 is less than the distance Lva of the portion 32a, it is not possible for the user to set the position A corresponding to the position of the portion 32a as the instruction input position.

In a case where a portion of an object, which is intended by the user (portion 32d in the example of FIG. 9) stays in the spatial region 30, the position of the portion 32d does not move much in many cases. Therefore, in a case where the input determination unit 22 continues to detect the closest portion for the threshold time in the local region in the spatial region 30, for example, the input determination unit 22 may regard the determination that the position on the display 12 corresponding to the position of the closest portion is set as the instruction input position, as an erroneous determination. The local region here means a region having a predetermined size, not a region at a specific position in the spatial region 30. The size of the local region may be defined in advance by the administrator of the information processing apparatus 10 or the like. Further, the threshold time may be defined in advance by the administrator of the information processing apparatus 10 or the like.

Specifically, the input determination unit 22 detects the closest portion at predetermined movement determination time intervals and saves the position of the closest portion at each time point. In a case where it is determined that the positions of a plurality of closest portions detected during the threshold time are all within a certain range (that is, within the local region), the determination that the positions on the display 12 corresponding to the positions of the closest portions are set as the instruction input positions is regarded as an erroneous determination.

In a case where the input determination unit 22 continues, for the threshold time, to detect that a distance between the position of the closest portion at the previous time point and the position of the closest portion at the next time point after the movement determination time from the previous time point in the plane direction parallel to the display 12 is less than a second threshold distance, the input determination unit 22 determines that the closest portion has been continuously detected for the threshold time within the local region in the spatial region 30. That is, in a case where the input determination unit 22 continues, for the threshold time, to detect that the distance between the instruction input position at the previous time point and the instruction input position at the next time point is less than the second threshold distance, the input determination unit 22 determines that the closest portion has been continuously detected for the threshold time within the local region in the spatial region 30.

In the present exemplary embodiment, in a case where the input determination unit 22 continues, for the threshold time, to detect that a distance between the position on the display 12 corresponding to the position of the closest portion at the previous time point and the position on the display 12 corresponding to the position of the closest portion at the next time point after the movement determination time from the previous time point is less than the second threshold distance, the input determination unit 22 determines that the closest portion has been continuously detected for the threshold time within the local region in the spatial region 30.

Specifically, the input determination unit 22 increments the counter each time the distance between the instruction input position at the previous time point and the instruction input position at the next time point becomes less than the second threshold distance. In a case where the counter has reached a predetermined value (since the closest portion is detected at the movement determination time intervals, the phase that the counter has reached the predetermined value means that a situation in which the distance between the instruction input position at the previous time point and the instruction input position at the next time point is less than the second threshold distance continues for the threshold time), the input determination unit 22 determines that the closest portion has been continuously detected for the threshold time within the local region in the spatial region 30. In a case where the distance between the instruction input position at the previous time point and the instruction input position at the next time point becomes equal to or more than the second threshold distance during the threshold time, the input determination unit 22 initializes the counter (returns to 0). The second threshold distance here may be set in advance by an administrator of the information processing apparatus 10 or the like.

Further, the input determination unit 22 may calculate a distance between the instruction input position detected at the leading of the threshold time, and each of a plurality of instruction input positions detected during the threshold time. In a case where a plurality of calculated distances are all less than the second threshold distance, the input determination unit 22 may determine that the closest portion has been continuously detected for the threshold time within the local region in the spatial region 30.

The distance between the closest portion at the previous time point and the closest portion at the next time point in the plane direction parallel to the display 12 is not necessarily calculated with the distance between the instruction input position at the previous time point and the instruction input position at the next time point. Such a distance may be obtained by directly calculating the distance between the closest portion at the previous time point and the closest portion at the next time point in the spatial region 30, in the XpYp plane direction.

The input determination unit 22 is capable of invalidating the instruction input for the instruction input position in a case where the determination that the position on the display 12 corresponding to the position of the closest portion is set as the instruction input position is regarded as an erroneous determination. Alternatively, the notification processing unit 26 (details will be described later) is capable of outputting a warning to the user in a case where the input determination unit 22 regards the determination that the position in the display 12 corresponding to the position of the closest portion is set as the instruction input position, as the erroneous determination.

As described above, the input determination unit 22 is capable of executing the process (referred to as a first erroneous determination process) of regarding the determination that the position in the display 12 corresponding to the second position is set as the instruction input position, as an erroneous determination in a case where the distance between the first position of the closest portion detected at the first time point and the second point of the closest portion detected at the second time point after the minute time has elapsed from the first time point, in the plane direction parallel to the display 12, is equal to or more than the threshold distance. In addition, the input determination unit 22 is capable of executing a process (referred to as a second erroneous determination process) of regarding the determination that the position on the display 12 corresponding to the second position is set as the instruction input position, as an erroneous determination in a case where the closest portion has been continuously detected for the threshold time within the local region in the spatial region 30.

Here, for example, the input determination unit 22 may select an appropriate process among the first erroneous determination process and the second erroneous determination process in accordance with the distance between the first position being the position of the closest portion at the first time point and the second position being the position of the closest portion at the second time point, in the plane direction parallel to the display 12, and execute the selected process. Specifically, in a case where the distance between the first position of the closest portion detected at the first time point and the second position of the closest portion detected at the second time point, in the plane direction parallel to the display 12, is equal to or more than the threshold distance, the input determination unit 22 may regard the determination that the position on the display 12 corresponding to the second position is set as the instruction input position, as an erroneous determination. In addition, in a case where the distance between the first position and the second position in the plane direction parallel to the display 12 is less than the threshold distance, and the closest portion has been continuously detected for the threshold time within the local region in the spatial region 30, the input determination unit 22 may regard the determination that, for example, the position on the display 12 corresponding to the position of the closest portion is set as the instruction input position, as an erroneous determination.

Figure 10:
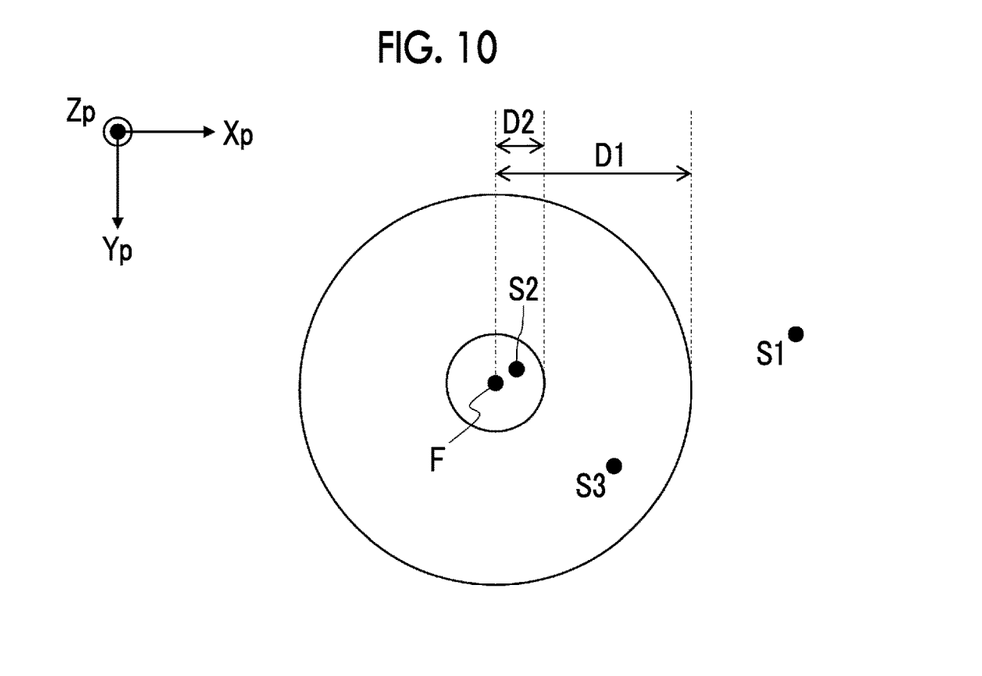
FIG. 10 is a diagram illustrating a threshold distance and a second threshold distance.

A specific description will be made with reference to FIG. 10. FIG. 10 is a diagram illustrating the threshold distance and the second threshold distance as viewed from the Zp axis direction. The point F represents the position of the closest portion at the first time point, that is, the first position. D1 indicates the threshold distance used as the reference in the first erroneous determination process, and a position spaced from the first position F by the threshold distance D1 is represented by an outer circle. D2 indicates the second threshold distance used as the reference in the second erroneous determination process, and a position spaced from the first position F by the second threshold distance D2 is represented by an inner circle.

It is assumed that the position of the closest portion at the second time point, that is, the second position is a position having the reference sign S1 illustrated in FIG. 10. In this case, the distance between the first position F and the second position S1 in a plane (XpYp plane) parallel to the display 12 is equal to or more than the threshold distance D1. Thus, the input determination unit 22 regards the determination that the position on the display 12 corresponding to the second position S1 is set as the instruction input position, as an erroneous determination by the first erroneous determination process.

It is assumed that the second position is the position of the reference sign S2 illustrated in FIG. 10. In this case, the distance between the first position F and the second position S2 in the plane parallel to the display 12 is less than the threshold distance D1 and less than the second threshold distance D2. Thus, the input determination unit 22 starts the second erroneous determination process. That is, in a case where the input determination unit 22 determines that the closest portion has been continuously detected within the local region in the spatial region 30 for the threshold time, the input determination unit 22 regards the determination that the position on the display 12 corresponding to the position of the closest portion is set as the instruction input portion, as an erroneous determination. As described above, in the present exemplary embodiment, in a case where the distance between the first position F and the second position S2 in the plane parallel to the display 12 is less than the second threshold distance D2, the input determination unit 22 determines whether the distance between the second position S2 and the position of the closest portion at a third time point after the movement determination time from the second time point, in the plane parallel to the display 12, is less than the second threshold distance D2. The input determination unit 22 repeats such a process every movement determination time. In a case where the input determination unit 22 determines that the closest portion has been continuously detected for the threshold time within the local region in the spatial region 30.

In a case where the second position is the position having the reference sign S3 illustrated in FIG. 10, that is, the distance between the first position F and the second position S3 in the plane parallel to the display 12 is less than the threshold distance D1 and equal to or more than the second threshold distance D2, the input determination unit 22 does not regard the determination that the position on the display 12 corresponding to the position of the second position S3 is set as the instruction input position, as an erroneous determination, and validates the instruction input position.

Returning to FIG. 1, the threshold distance setting unit 24 sets the above-described threshold distance. The threshold distance may be set as a parameter common to all users. The threshold distance setting unit 24 may set the threshold distance for each user. For example, the threshold distance setting unit 24 sets the threshold distance for each user in response to an instruction from each user, and stores a user ID for identifying the user and the threshold distance of the user in the memory 16 in association with each other. The user ID may be obtained by the processor 18 authenticating the user prior to the non-contact operation on the display 12.

Further, the threshold distance setting unit 24 may determine the threshold distance of each user in accordance with the movement speed of the operation object 32 for the non-contact operation of each user in the past. Specifically, the threshold distance setting unit 24 calculates the movement speed of the operation object 32 based on the position of the closest portion of the operation object 32, which has been detected by the object detection unit 20 at unit time intervals. In this state, the threshold distance setting unit 24 sets the threshold distance longer for the user with the faster movement speed, and sets the threshold distance shorter for the user with the slower movement speed. Thus, it is possible to improve the determination accuracy in which the determination that the position on the display 12 corresponding to the second position is set as the instruction input position is regarded as an erroneous determination, in accordance with the movement speed of the operation object 32 for the non-contact operation of each user.

The notification processing unit 26 performs a process of notifying the user of the determination result of the input determination unit 22. For example, the notification processing unit 26 displays a pointer indicating the instruction input position determined by the input determination unit 22, on the display 12.

Further, in a case where the input determination unit 22 regards the determination that the position on the display 12 corresponding to the second position is set as the instruction input position, as an erroneous determination, the notification processing unit 26 outputs a warning to the user. In a case where the notification processing unit 26 outputs a warning to the user, the input determination unit 22 may or may not invalidate the instruction input to the position on the display 12 corresponding to the second positions.

The warning may be a warning for notifying the user that the instruction input position has been erroneously determined. For example, the notification processing unit 26 displays a message indicating that the instruction input position has been erroneously determined, on the display 12. Further, the warning may be a warning for notifying the user of the position in the display 12 corresponding to the second position. For example, the notification processing unit 26 displays a pointer having a display form different from a normal display form (for example, a different color or blinking), at the position in the display 12 corresponding to the second position. As a result, it is possible for the user to grasp the second position.

Further, the notification processing unit 26 may output the warning by a method with sound, vibration, or the like, or a method in which at least two of display, sound, and vibration are combined, instead of or in addition to the display on the display 12.

The configuration of the information processing apparatus 10 according to the present exemplary embodiment is as described above. The processing flow of the information processing apparatus 10 according to the present exemplary embodiment will be described below with reference to the flowchart illustrated in FIG. 11.

Figure 11:
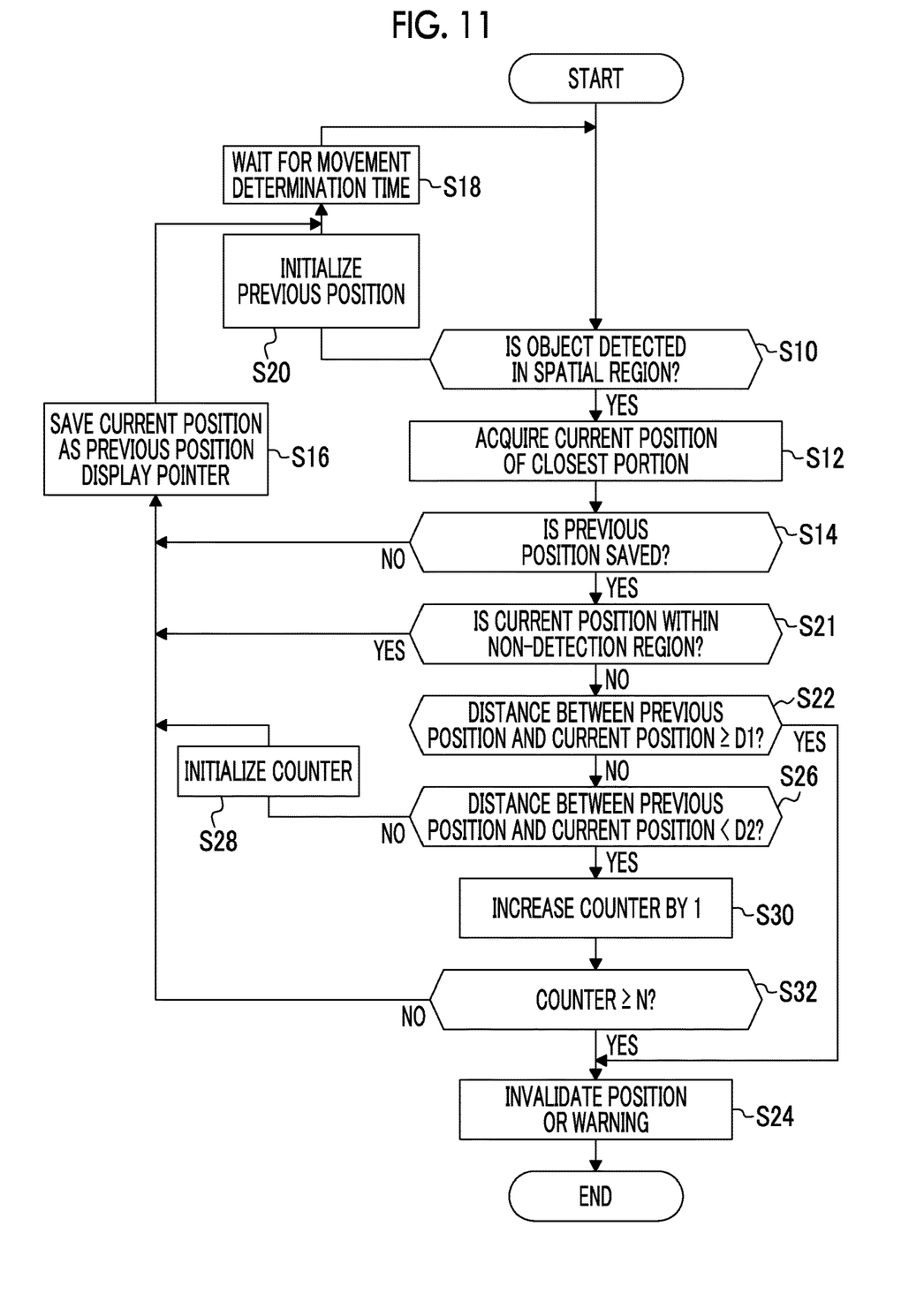
FIG. 11 is a flowchart illustrating a processing flow of the information processing apparatus according to the present exemplary embodiment.

In Step S10, the object detection unit 20 determines, based on the detection signal from the object sensor 14, whether or not an object has been detected in the spatial region 30 facing the display 12 which is an operation surface to be a target of a non-contact operation. Here, it is assumed that the object is detected in the spatial region 30, and the process proceeds to Step S12.

In Step S12, the object detection unit 20 detects the closest portion being a portion having the shortest distance from the display 12 in the perpendicular direction (Zp axis direction) among portions of the object in the spatial region 30. Then, the object detection unit 20 acquires the current position being the position of the closest portion.

In Step S14, the input determination unit 22 determines whether or not the previous position which is the position of the closest portion detected at the previous time point, is saved. Here, it is assumed that the previous position is not saved, and the process proceeds to Step S16.

In Step S16, the input determination unit 22 saves the current position of the closest portion acquired in Step S12, in the memory 16 as the previous position. Here, the previous position is set as the first position. Further, the notification processing unit 26 displays a pointer at a position on the display 12 corresponding to the previous position.

In Step S18, the input determination unit 22 waits for a movement determination time which is a minute time.

In Step S10 again, the object detection unit 20 determines whether or not the object has been detected in the spatial region 30. Here, in a case where the object is not detected, that is, in a case where the object including the closest portion detected in the previous Step S12 is moved out of the spatial region 30, the process proceeds to Step S20. In Step S20, the input determination unit 22 erases the previous position saved in the previous Step S16 from the memory 16. The notification processing unit 26 hides the pointer displayed in the previous Step S16. Here, even in Step S10 again, it is assumed that the object has been detected in the spatial region 30, and the process proceeds to Step S12.

In Step S12 again, the object detection unit 20 detects the closest portion again and acquires the current position of the closest portion. Here, the current position is set as the second position.

Since the previous position is saved in Step S14 again, the process proceeds to Step S21.

In Step S21, the input determination unit 22 determines whether or not the current position is within the non-detection region 30a. In a case where the current position is within the non-detection region 30a, the process proceeds to Step S16. In a case where the current position is not within the non-detection region 30a, the process proceeds to Step S22.

In Step S22, the input determination unit 22 determines whether or not a distance between the previous position (here, the first position) and the current position (here, the second position) in the plane direction parallel to the display 12 is equal to or more than the threshold distance D1. In a case where such a distance is equal to or more than the threshold distance D1, the process proceeds to Step S24.

In Step S24, the input determination unit 22 regards the determination that the position in the display 12 corresponding to the current position is set as the instruction input position, as an erroneous determination. In this state, the input determination unit 22 invalidates the instruction input to the position on the display 12 corresponding to the current position, or the notification processing unit 26 outputs a warning to the user.

In Step S22, in a case where the distance between the previous position and the current position in the plane direction parallel to the display 12 is less than the threshold distance D1, the process proceeds to Step S26.

In Step S26, the input determination unit 22 determines whether or not the distance between the previous position and the current position in the plane direction parallel to the display 12 is less than the second threshold distance D2. In a case where the distance is not less than the second threshold distance D2, the process proceeds to Step S28. In Step S28, the input determination unit 22 initializes the counter (counter for determining that the closest portion has been continuously detected for the threshold time within the local region in the spatial region 30). Then, the process returns to Step S16.

In Step S26, in a case where the distance between the previous position and the current position in the plane direction parallel to the display 12 is less than the second threshold distance D2, the input determination unit 22 causes the process to proceed to Step S30. In Step S30, the input determination unit 22 increases the counter by 1. The counter is initialized at the start of this flowchart.

In Step S32, the input determination unit 22 determines whether or not the counter has reached a predetermined value N. In a case where the counter has reached the predetermined value N, the input determination unit 22 determines that the closets portion has been continuously detected for the threshold time within the local region in the spatial region 30. Then, the process proceeds to Step S24. In a case where the counter has not reached the predetermined value N, the process returns to Step S16, and the processes of Steps S16, S18, S10, S12, S14, S22, S26, and S30 are repeated.

Hitherto, the exemplary embodiment of the present invention has been described, but the exemplary embodiment of the present invention is not limited to the above exemplary embodiment, and various modifications may be made without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to:
        detect a closest portion being a portion having a shortest distance from an operation surface in a perpendicular direction of the operation surface among portions of an object in a spatial region facing the operation surface;
        determine a position on the operation surface corresponding to a position of the closest portion as an instruction input position by a non-contact operation of a user; and
        in a case where a distance between a first position of the closest portion, which is detected at a first time point, and a second position of the closest portion, which is detected at a second time point after a minute time has elapsed from the first time point, in a plane direction parallel to the operation surface is equal to or longer than a threshold distance, invalidate an instruction input on a position on the operation surface corresponding to the second position or output a warning to the user.

2. The information processing apparatus according to claim 1, wherein the processor is configured to:
    in a case where the distance between the first position of the closest portion, which is detected at the first time point, and the second position of the closest portion, which is detected at the second time point after the minute time has elapsed from the first time point, in the plane direction parallel to the operation surface is equal to or longer than the threshold distance, regard a determination that the position on the operation surface corresponding to the second position is set as the instruction input position, as an erroneous determination.

3. The information processing apparatus according to claim 2, wherein the processor is configured to:
    in a case where the second position is located on an opposite side of a direction in which the user is estimated to exist with respect to the first position, not regard the determination that the position on the operation surface corresponding to the second position is set as the instruction input position, as the erroneous determination.

4. The information processing apparatus according to claim 3,
    wherein, in a case where the operation surface is erected or the operation surface is tilted to face a horizontal direction and an upper side in a vertical direction, a downward direction along the plane direction parallel to the operation surface with respect to the first position is the direction in which the user is estimated to exist.

5. The information processing apparatus according to claim 2,
    wherein an instruction is allowed to be input to the operation surface by gesture, and
    the processor is configured to: in a case where the second position is located in a direction defined by the gesture with respect to the first position, not regard the determination that the position on the operation surface corresponding to the second position is set as the instruction input position, as the erroneous determination.

6. The information processing apparatus according to claim 2, wherein the processor is configured to:
    in a case where the distance between the first position of the closest portion, which is detected at the first time point, and the second position of the closest portion, which is detected at the second time point after the minute time has elapsed from the first time point, in the plane direction parallel to the operation surface is equal to or longer than the threshold distance, regard a determination that the position on the operation surface corresponding to the second position is set as the instruction input position, as an erroneous determination, and
    in a case where the distance between the first position and the second position in the plane direction parallel to the operation surface is shorter than the threshold distance, and the closest portion is continuously detected within a local region in the spatial region for a threshold time, regard a determination that the position on the operation surface corresponding to the position of the closest portion is set as the instruction input position, as an erroneous determination.

7. The information processing apparatus according to claim 1,
    wherein the threshold distance is settable for each user.

8. The information processing apparatus according to claim 7, wherein the processor is configured to:
    determine the threshold distance of each user in accordance with a movement speed of an operation object for a non-contact operation of each user in the past.

9. A non-transitory computer readable medium storing an information processing program causing a computer to execute a process comprising:
- detecting a closest portion being a portion having a shortest distance from an operation surface in a perpendicular direction of the operation surface among portions of an object in a spatial region facing the operation surface;
- determining a position on the operation surface corresponding to a position of the closest portion as an instruction input position by a non-contact operation of a user; and
- in a case where a distance between a first position of the closest portion, which is detected at a first time point, and a second position of the closest portion, which is detected at a second time point after a minute time has elapsed from the first time point, in a plane direction parallel to the operation surface is equal to or longer than a threshold distance, invalidating an instruction input on a position on the operation surface corresponding to the second position or outputting a warning to the user.

10. An information processing method comprising:
- detecting a closest portion being a portion having a shortest distance from an operation surface in a perpendicular direction of the operation surface among portions of an object in a spatial region facing the operation surface;
- determining a position on the operation surface corresponding to a position of the closest portion as an instruction input position by a non-contact operation of a user; and
- in a case where a distance between a first position of the closest portion, which is detected at a first time point, and a second position of the closest portion, which is detected at a second time point after a minute time has elapsed from the first time point, in a plane direction parallel to the operation surface is equal to or longer than a threshold distance, invalidating an instruction input on a position on the operation surface corresponding to the second position or outputting a warning to the user.

* * * * *